Patented Oct. 18, 1949

2,485,454

UNITED STATES PATENT OFFICE 2,485,454

LOW-TEMPERATURE CATALYTIC PROCESS FOR POLYMERIZING OLEFINIC MATERIALS IN THE PRESENCE OF AN INORGANIC DILUENT

Joseph F. Nelson, Elizabeth, and William J. Sparks, Cranford, N. J., assignors to Standard Oil Development Company, a corporation of Delaware No Drawing. Application September 27, 1945, Serial No. 618,996

3 Claims. (Cl. 260—85.3)

This invention relates to a process technique or method which is useful in polymerizing unsaturated organic compounds in a diluent with a Friedel-Crafts type catalyst at low temperatures. More particularly, it relates to an effective utilization of an inorganic diluent in such reactions.

It is known that a number of organic compounds are satisfactorily polymerized to high molecular weight products with Friedel-Crafts type catalysts typified by boron trifluoride and aluminum chloride in solutions at temperatures below 0° C., e. g., at —20° C. to below —100° C. in certain diluents. The polymerizable compounds which may thus be reacted include alkenes having 3 to 8 carbon atoms, such as propene, isobutene, and their homologs; dienes, such as butadiene, isoprene, dimethylbutadiene, and the like; alkynes; polyenes having more than 2 double bonds; and unsaturated cyclic compounds, such as styrene, alkyl styrenes, halostyrenes, and the like. Such reactants are polymerized or copolymerized rapidly under these conditions, and in general, the extent of polymerization is increased with lowering of the temperature and with more effective mixing of the catalyst with the reactants in a suitable diluent.

An important problem in the low temperature catalytic polymerization technique has been the provision of proper diluents. Certain diluents have been used with much greater advantage than others. Many polar organic compounds, e. g., oxygen-containing compounds like alcohols, cannot be used as diluents because they poison the catalyst when used in diluent proportions. Many organic compounds become solid before the desired low reaction temperatures are reached. In some organic compounds used as diluents, the polymer products are miscible and form viscous solutions which are difficult to handle for proper agitation, heat transfer, and recovery. In others, the products precipitate out as gummy masses that agglomerate and foul reaction apparatus, i. e., the gummy masses coat the reactor wall and clog withdrawal pipes. Accordingly, a very limited number of compounds were found to be suitable as diluents. The preferred types of diluents have been organic or carbon compounds such as the low boiling hydrocarbons, ethane, ethylene, propane, and butanes, low boiling alkyl halides such as methyl chloride, ethyl chloride, and methylene chloride. Carbon disulfide was found suitable as a diluent to some extent but was found to have the tendency of dissolving the polymers.

An object of this invention is to provide an improvement in the low temperature catalytic technique by the use of a reaction mixture diluent which gives advantages of the preferred types of organic diluents and in addition other desirable advantages. Attainment of this and further objects will be explained in the following description.

Although the preferred diluents hitherto have been considered to be essentially organic compounds, the present invention establishes the fact that certain inorganic compounds function as satisfactory diluents and even more favorably than organic diluents in some respects. The inorganic diluents are represented particularly and preferably by liquefied nitrous oxide, which may be characterized as a normally gaseous compound that is stable and inert under the polymerization reaction conditions, that becomes homogeneously mixed with or suitably diffused through the polymerizable reactants, but tends to precipitate the resulting polymer product as a slurry of particles which are not sticky and which do not agglomerate.

In performing the low temperature polymerization, the reactant feed is preferably mixed with the inorganic diluent, and the resulting mixture is maintained at the reaction temperature by internal or external refrigeration. The catalyst is added to the refrigerated mixture which is vigorously agitated. The lower the temperature, other things being the same, the higher will be the molecular weight of the product. Since the polymerization reaction is highly exothermic, provision must be made for rapid removal of heat formed by the reaction to maintain the desired low polymerization temperature uniformly throughout the reaction mixture. Therefore, the reaction temperature is most efficiently maintained, if the reaction mixture is easily agitated and good heat transfer conditions are obtained.

An inorganic diluent having the characteristics of liquid nitrous oxide, in which the polymer precipitates as a relatively dry slurry, allows the reaction mixture to remain unthickened for easy agitation even with a high concentration of the reactants and reduces adhesion of the polymer to the reactor walls so that excellent heat transfer is obtained.

The catalyst is best added to the reactant-diluent mixture in the form of a solution. The low boiling alkyl halides and to some extent the low boiling unreactive hydrocarbons are suitable solvents in preparing the catalyst solution. The Friedel-Crafts catalyst is dissolved in the solvent preferably in concentrations of about 0.1% to about 6% and the catalyst solution is preferably precooled prior to admixing with the diluent and reactant mixture. External cooling of the reaction mixture is accomplished by having a selected refrigerant in a jacketed compartment surrounding the reactor. Also, cooling of the reaction mixture may be accomplished by the vaporization of the diluent or of an added internal refrigerant having a lower boiling point than the diluent.

Under approximately atmospheric pressure, nitrous oxide functions itself as a refrigerant at close to —90° C., and its boiling point can be raised with increase in pressure until its critical temperature of 36.5° C. is reached. Its boiling point may be lowered by decrease in pressure. Also, the presence of other volatile components may affect the boiling point. The liquid nitrous oxide begins to solidify at about —102° C., but pressure and the presence of other components may prevent solidification through a further lowering of temperature.

Liquid ethylene may be used as an external refrigerant or added internal refrigerant to maintain a temperature below about —100° C. in the reaction mixture containing liquid nitrous oxide as a diluent, the liquid ethylene being subjected to about 1 atm. of pressure. Examples of other external refrigerants are liquefied propane, solid carbon dioxide, and liquefied ethane. By adjustment of the reaction mixture composition and applied pressure for the refrigerant used and with control of evaporation or boiling of the refrigerant by the pressure imposed thereon, the reaction mixture may be maintained at a selected polymerization temperature.

When the polymerization reaction is completed, it is desirable to be able to readily remove a slurry of precipitated polymer from the reaction apparatus. Removal of the slurry is most conveniently carried out if the polymer does not agglomerate or stick to the apparatus walls, and the removal of polymer slurried in the inorganic diluent has been found to be highly satisfactory. The precipitated polymer may then be separated from residual liquid ingredients of the reaction mixture by straining, filtering, or other physical means, then be washed and finally dried, if necessary. With lessened tendency to agglomerate, the precipitated polymer is also more easily separated by vaporization of residual liquid. In some instances, it is desired to add the polymer slurry directly to a suitable organic solvent, e. g., light naphtha. Separation of the normally gaseous inorganic diluent is easily accomplished in all instances.

Also, as is ordinarily done when wholly organic diluents are used, after completion of the polymerization reaction, excess catalyst remaining in the reaction mixture may be promptly hydrolyzed or deactivated by the addition of a polar compound, such as water, alkaline aqueous solution, alcohol, acetone, or the like. Such deactivating polar compounds also act as precipitants of polymer in organic diluents, and their use is mostly necessary when the polymer product tends to dissolve in the reaction mixture. However, in using an inorganic diluent, such as liquid nitrous oxide, which acts as a precipitant, there is no need for addition of another precipitant. Elimination of the need for an added precipitant which deactivates the catalyst simplifies the process and helps avoid contamination of the reaction system by catalyst poisons.

The most used Friedel-Crafts type catalysts for the low temperature polymerization reactions have been boron fluoride and aluminum halide in solution, but other metal halides which are less common members of the general class of Friedel-Crafts catalysts may be used. A number of other available Friedel-Crafts catalysts are listed in the article by N. O. Calloway, in "Chemical Reviews," issued by the A. C. S. at Baltimore, 1935, vol. 17, No. 3, beginning on p. 327.

The following examples are given for the sake of illustration without intention of limiting the invention specifically thereto:

*Example I*

A feed consisting of 228 grams (one volume) of isobutylene, 6.83 grams of isoprene, and three volumes of nitrous oxide was externally cooled with liquid ethylene and vigorously agitated while a catalyst was added at a rate of 37 cc./min. in the form of a fine jet. The catalyst consisted of a solution of aluminum chloride in methyl chloride (0.20 g. $AlCl_3$/100 cc. MeCl).

The reaction proceeded at a rapid but controllable rate. Catalyst addition was terminated as soon as the desired conversion was obtained. The yield was 148 grams of precipitated polymer (65% conversion). This yield represents 470 grams of polymer per gram of $AlCl_3$ which represents a very satisfactory operation. The polymer product had a Staudinger molecular weight of 48,000 and a mole per cent unsaturation of 1.83 per cent. The product was cured. Data on the cured rubber were very satisfactory:

| Cure [1] at 307° F. | Tensile Strength (lbs./sq. in.) | Per Cent Elongation | Modulus at— | |
|---|---|---|---|---|
| | | | 300% Elongation | 400% Elongation |
| 20 min | 2,570 | 950 | 280 | 510 |
| 40 min | 2,780 | 840 | 490 | 850 |
| 60 min | 2,770 | 740 | 640 | 1,000 |

Mooney viscosity (8 min. at 212° F.): 47 on the uncured rubber.
[1] Compounding recipe: Parts
Rubber _____ 100
Carbon black _____ 50
Stearic acid _____ 3
Zinc oxide _____ 5
Tetramethyl thiuram disulfide _____ 1
Mercaptobenzothiazole _____ 0.5
Sulfur _____ 2

*Example II*

Several polymerizations were made in a manner analogous to the one described in Example I, except that liquid ethylene was used as a diluent in place of nitrous oxide. Data showing the comparison between the molecular weights of the products made in ethylene diluent and in nitrous oxide diluent are as follows:

| Exp. No. | Diluent | | Weight Per Cent Isoprene [1] | Staudinger Molecular Weight |
|---|---|---|---|---|
| | Type | Volume Ratio to Reactants | | |
| 1 | $N_2O$ | 3 to 1 | 3.0 | 48,000 |
| 2 | $C_2H_4$ | 3 to 1 | 2.5 | 40,000 |
| 3 | $C_2H_4$ | 2 to 1 | 3.0 | 41,000 |

[1] Based on isobutylene.

Since experience has shown that decreasing the diluent ratio and decreasing the isoprene content gives higher molecular weights when all other conditions are constant, it is obvious from the above data that the use of nitrous oxide as a diluent tends to give a higher molecular weight polymer than does the use of ethylene.

Other virtues sought for and obtained in the use of an inorganic solvent medium or diluent for carrying out the low temperature reactions are nonflammability, low reactivity, and selective solvent power for the reactants and catalyst but not for the polymer.

Investigations have shown that an oxide of nitrogen, particularly liquefied nitrous oxide, is an excellent medium in most respects for carrying out the polymerization of all types of unsaturated polymerizable reactants at temperatures down to below —100° C. Liquid sulfur dioxide is another example of an inorganic diluent which may be used, but to a more limited extent. Sulfur dioxide has a normal boiling point of —10° C. and a melting point of —72.7° C. As in the use of the organic diluents, the number of suitable inorganic diluents is very limited.

For some reactions, mixed diluents may be used advantageously, e. g., an inorganic diluent, such as the preferred liquid nitrous oxide mixed with an alkyl halide solvent in varied proportions. It is generally expedient to use from about 1 to 6 volumes of diluent per volume of reactant or reactants, although at times this ratio may be varied. The inorganic diluent with good precipitating effect on the polymer allows the use of higher concentrations of the reactants and leads to better control of the operation during and following the reaction. If the inorganic diluent undergoes vaporization in acting as a refrigerant, a sufficient excess quantity of this diluent may be supplied to the reaction mixture in order to obtain a final slurry of precipitated polymer product.

The foregoing examples demonstrate the feasibility and advantages in the use of the inorganic diluent for a preferred mode of operation in the preparation of resinous and rubbery copolymers, but the inorganic diluent may be used in a similar manner to polymerize any of the various unsaturated compounds that are polymerizable under similar conditions. For example, high molecular weight polyisobutylene, polystyrene, or copolymers of isobutylene and styrene may be formed as slurries in the inorganic diluent. These are typical examples of polymer products that are obtainable with the low temperature catalytic polymerization technique.

While a limited number of embodiments of this invention have been described in detail, it is to be understood that still other embodiments come within the spirit and scope of the invention as defined in the appended claims.

We claim:

1. In a process for copolymerizing a major proportion of isobutylene with a minor proportion of isoprene at a polymerization temperature between —20° C. and —100° C. with a Friedel-Crafts catalyst, the steps of forming a liquid reaction mixture by mixing the isobutylene and isoprene with nitrous oxide in liquid phase, cooling the liquid mixture to the polymerization temperature, admixing with the cooled liquid mixture a solution of aluminum chloride in methyl chloride whereby the isobutylene and isoprene are copolymerized, and withdrawing a slurry containing non-agglomerating particles of the resulting solid polymer precipitated by said nitrous oxide.

2. A process for forming solid high molecular weight polymers which comprises mixing a hydrocarbon reactant comprising a major proportion of isobutylene and a minor proportion of isoprene with liquid nitrous oxide diluent, refrigerating the reaction mixture to a polymerization temperature between —20° C. and —100° C., admixing with the refrigerated reaction mixture a Friedel-Crafts catalyst dissolved in an alkyl halide which is liquid at the polymerization temperature whereby the reactant is polymerized, and withdrawing a slurry containing non-agglomerating particles of the resulting solid polymer precipitated by said nitrous oxide.

3. A process according to claim 2 wherein the catalyst is an alkyl halide solution of aluminum chloride.

JOSEPH F. NELSON.
WILLIAM J. SPARKS.

REFERENCES CITED

The following references are of record in the file of this patent:

UNITED STATES PATENTS

| Number | Name | Date |
|---|---|---|
| 2,245,721 | Ross et al. | June 17, 1941 |
| 2,387,499 | Daly | Oct. 23, 1945 |

FOREIGN PATENTS

| Number | Country | Date |
|---|---|---|
| 528,051 | Great Britain | Oct. 22, 1940 |

OTHER REFERENCES

Snow & Frey, Ind. & Eng. Chemistry, vol. 30, No. 2 (February 1938), pp. 176-182.